US005856628A

United States Patent [19]

Noguchi et al.

[11] Patent Number: 5,856,628

[45] Date of Patent: Jan. 5, 1999

[54] TABLE-TYPE ELECTRONIC PERCUSSION INSTRUMENT

[75] Inventors: Yoshitaka Noguchi; Masaaki Mizuguchi, both of Hamamatsu, Japan

[73] Assignee: Yamaha Corporation, Hamamatsu, Japan

[21] Appl. No.: 891,930

[22] Filed: Jul. 14, 1997

[30] Foreign Application Priority Data

Jul. 16, 1996 [JP] Japan .................................... 8-185903

[51] Int. Cl.$^{6}$ .......................... G09B 15/00; G10D 13/02; G10H 1/34

[52] U.S. Cl. ................................ 84/738; 84/743; 84/421; 84/470 R; 84/DIG. 12

[58] Field of Search .................. 84/470 R, 411 R–422.4, 84/644, 670, 718–721, 743, 738, DIG. 12

[56] References Cited

U.S. PATENT DOCUMENTS 1,994,889 3/1935 Hammond ............................ 84/738 X
2,038,995 4/1936 Hammond ............................ 84/738 X
3,478,159 11/1969 Olson ................................ 84/470 R X
3,551,580 12/1970 Glenn et al. .
3,584,530 6/1971 Andersen .............................. 84/470 R
3,610,086 10/1971 Decker ................................. 84/470 R
3,659,032 4/1972 May ................................. 84/DIG. 12
3,750,516 8/1973 Olson ................................... 84/470 R
3,895,555 7/1975 Peterson et al. ...................... 84/470 R
3,922,944 12/1975 Kurosaki et al. .
3,991,648 11/1976 Karpowicz ............................ 84/470 R
4,479,412 10/1984 Klynas .
4,691,611 9/1987 May .......................................... 84/421
5,115,706 5/1992 Aluisi .
5,335,283 8/1994 Torii ...................................... 84/719 X
5,602,354 2/1997 Martin .

FOREIGN PATENT DOCUMENTS 0 600 363 6/1994 European Pat. Off. .
3930346 3/1991 Germany .
4-3358 2/1992 Japan .
5-19718 3/1993 Japan .
2 204 727 11/1988 United Kingdom .

*Primary Examiner*—Stanley J. Witkowski
*Attorney, Agent, or Firm*—Graham & James LLP

[57] ABSTRACT

A table-type electronic percussion instrument is constructed by a table board, legs, pads as well as a musical tone generation circuit and a speaker system. Herein, the table board has a specific shape such as a pentagon-like shape which enables multiple persons to seat. The table board is supported by the legs and is constructed by a base material having a high rigidity and a dressing board like a plywood. The dressing board covers a surface of the base material through which holes are formed. The pads are arranged on a surface of the dressing board to match with locations of the holes. Sensors are provided inside of the holes and are attached to a backside of the dressing board. So, the sensors are arranged to detect striking force which is imparted to each of the pads by the persons. The musical tone generation circuit is provided beneath the table board to convert electric signals of the sensors to musical tone signals. The speaker system is located beneath the table board to generate musical tones (e.g., percussion sounds) based on the musical tone signals. For example, if the pads act like electronic drums and/or electronic cymbals, the speaker system generates drum sounds and/or cymbal sounds when the pads are struck by the persons. Thanks to the table-like construction, the electronic percussion instrument is shared by multiple persons to play an ensemble. Incidentally, the musical tone generation circuit contains a mixing circuit which performs mixing operations on the musical tone signals corresponding to the pads and other musical tone signals supplied thereto. So, the musical tone generation circuit outputs mixed musical tone signals, based on which the speaker system generates mixed musical tones.

11 Claims, 3 Drawing Sheets

TABLE-TYPE ELECTRONIC PERCUSSION INSTRUMENT

BACKGROUND OF THE INVENTION

1. Field of the Invention

This invention relates to electronic percussion instruments which are preformed to generate percussion sounds.

2. Prior Art

Conventionally, there are provided multiple kinds of electronic percussion instruments such as electronic drums and electronic cymbals. For example, an example of the electronic drum is disclosed by the papers of Japanese Patent Publication No. 5-19718, whilst an example of the electronic cymbal is disclosed by the papers of Japanese Utility-Model Publication No. 4-3358.The electronic drums and electronic cymbals conventionally known have a same basic configuration which is designed to generate electronic sounds. According to the basic configuration, vibrations which occur on pads are converted to electric signals, based on which a musical tone generation circuit produces musical tone signals which are supplied to speakers or headphone to generate electronic sounds. In order to obtain performance feelings which are similar to those of the acoustic instruments corresponding to drums, pads are generally constructed using a flexible film. In the case of the electronic cymbals, pads are constructed using a plate made of plastics having rigidity to provide performance feelings which are similar to those of the acoustic instruments corresponding to cymbals. Both of the electronic drum and electronic cymbal are designed to be attached to an instrument stand or a bus drum by means of an instrument holder. So, they are played by a single performer.

As described above, the conventional electronic percussion instruments are designed to be played by a single performer. In other words, the conventional technology fails to provide an electronic percussion instrument which can be shared by multiple persons but which can arbitrarily genenerate musical tones designated by multiple persons individually. So, when playing an ensemble using the conventional technology, it is necessary to provide multiple instruments which are played by multiple performers individually.

SUMMARY OF THE INVENTION

It is an object of the invention to provide a table-type electronic percussion instrument which is shared by multiple persons to play an ensemble and which can be used as a general-use table as well.

A table-type electronic percussion instrument of this invention is constructed by a table board, legs, pads as well as a musical tone generation circuit and a speaker system. The table board is supported by the legs and is constructed by a base material having a high rigidity and a dressing board. The dressing board covers a surface of the base material through which holes are formed. The pads are arranged on a surface of the dressing board to match with locations of the holes. Sensors are provided inside of the holes and are attached to a backside of the dressing board. So, the sensors are arranged to detect striking force which is imparted to each of the pads by persons. The musical tone generation circuit is provided beneath the table board to convert electric signals of the sensors to musical tone signals. The speaker system is located beneath the table board to generate musical tones based on the musical tone signals.

For example, if the pads act like electronic drums and/or electronic cymbals, the speaker system generates drum sounds and/or cymbal sounds when the pads are struck by the persons.

Thanks to the table-like construction, multiple persons are capable of sharing and performing the electronic percussion instrument to generate musical tone signals individually for an ensemble. Of course, the electronic percussion instrument of this invention can be used as a general-use table.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Now, a description will be given with respect to a table-type electronic percussion instrument of the preferred embodiment of this invention with reference to drawings wherein parts equivalent to those in several drawings will be designated by the same numerals; hence, the description thereof will be omitted occasionally.

Figure 1:
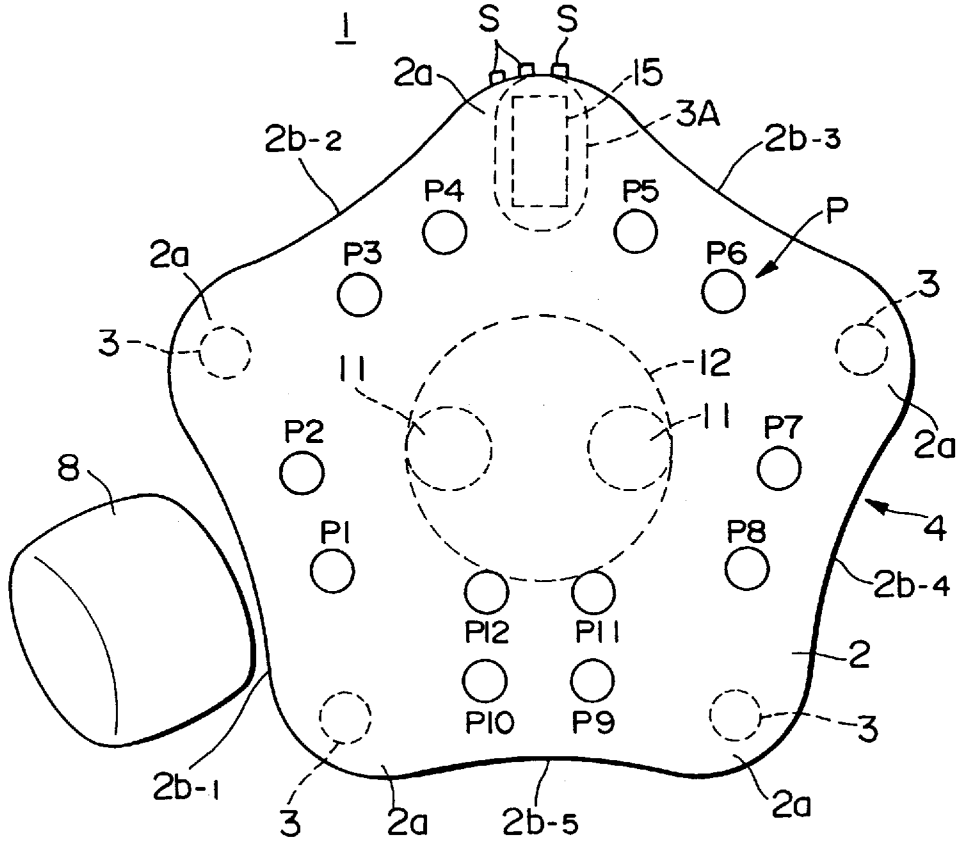
FIG. 1 is a plan view showing a table-type electronic percussion instrument which is designed in accordance with an embodiment of the invention.
Figure 2:
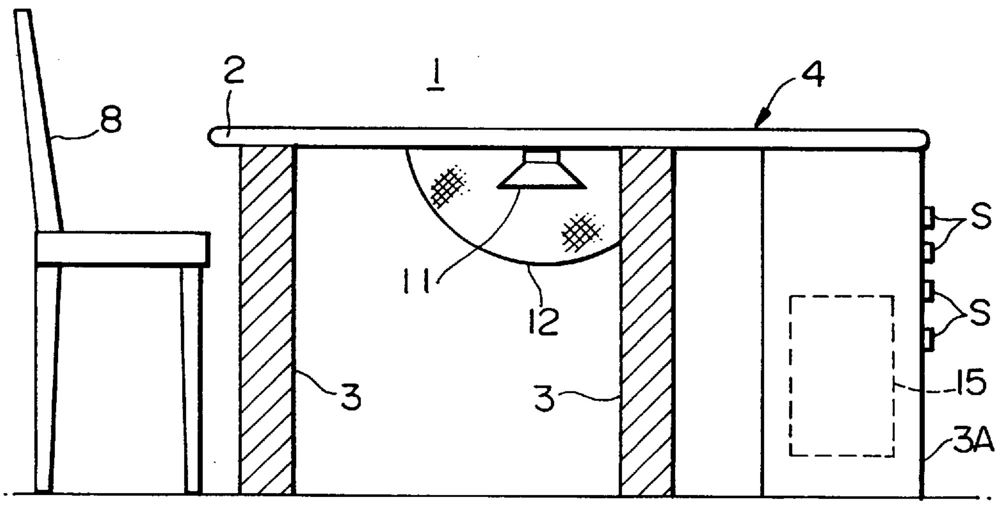
FIG. 2 is a side view of the table-type electronic percussion instrument.
Figure 3:
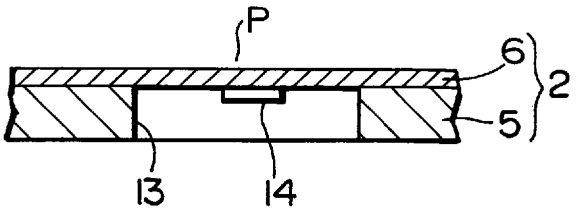
FIG. 3 is a cross-sectional view showing a partial construction of a table board.

FIG. 1 is a plan view showing a table-type electronic percussion instrument 1 which is designed in accordance with an embodiment of the invention. FIG. 2 is a side view illustrating an appearance of the table-type electronic percussion instrument 1 taken in a side-view angle as well as a chair 8. FIG. 3 is a cross-sectional view showing a partial construction of a table board 2 which is an essential element of the table-type electronic percussion instrument 1. Herein, the table-type electronic percussion instrument 1 contains a table-type main body 4 which is constructed by the table board 2 and five legs 3. The table board 2 has a relatively large surface on which pads P (i.e., P1 to P12) are arranged. The table board 2 is supported by the five legs 3. The table board 2 is formed in a pentagon-like shape in a plan-view angle. In a non-performance mode, the table-type electronic percussion instrument 1 can be used as a general-use table which seats five persons. The table board 2 provides five corners '2a', each of which is formed in a round shape. A lower face of the corner 2a is supported by the leg 3. An certain interval of distance which is broader than a width of the chair 8 which normally seats only one person is set between two legs 3 which are arranged adjacent to each other. Since the table board 2 is formed in the pentagon-like shape, there are provided five sides 2b-1 to 2b-5 placed between the five corners 2a. Herein, each side is formed to have a gradually and concavely curved face.

As shown in FIG. 3, the table board 2 is constructed by a base material 5 and a dressing board 6. Herein, the base material 5 is formed by woods in a board shape having a high rigidity, whilst the dressing board 6 is formed by a three-ply wood (i.e., plywood). The dressing board 6 covers an overall surface of the base material 5. As shown in FIG. 2, two speakers 11 and a net-like cover 12 are attached to a center area of a backside of the base material 5 of the table board 2. The cover 12 is located to cover the speakers 11. Further, twelve holes are formed at the backside of the table board 2. The holes 13 are arranged to surround the cover 12 and are also disposed to match with the pads P1 to P12 respectively. Among the pads, locations of the pads P1 to P8 are determined to be different from locations of the pads P9 to P12. That is, the pads P1 and P2 are located with a certain distance along with the side 2b-1; the pads P3 and P4 are located with a certain distance along with the side 2b-2; the pads P5 and P6 are located with a certain distance along with the side 2b-3; the pads P7 and P8 are located with a certain distance along with the side 2b-4. On the other hand, the pads P9 and P10 as well as the pads P11 and P12 are disposed in lines along with the side 2b-5. There are provided a variety of ways to use (or perform) the pads. For example, the two pads P1 and P2 are used as electronic drums. In this case, the pad P1 is struck to generate a normal sound of drum, whilst the other pad P2 is struck to generate a rim shot sound. In the case where the pads P1 and P2 are used as electronic cymbals, the pad P1 is struck to generate a normal sound of cymbal, whilst the other pad P2 is struck to generate a cup sound. As for the four pads P9 to P12, two of them are used as electronic drums while the others are used as electronic cymbals, for example.

The locations of the pads are visually designated (or displayed) by printing characters, marks or pictures on the surface of the dressing board 6 or by attaching sheets to the surface of the dressing board 6. Visual display of the pads is not limited to the above. For example, the pads are covered by a sheet member such as a place mat (or lunch mat) on which marks, characters or pictures are printed. The mat can be replaced with another mat occasionally. So, it is possible to change the atmosphere of the room by changing the mat of the table-type electronic percussion instrument 1. Further, it is possible to cover the pads with a tablecloth which provides visual display sections to visually display the pads. In that case, functions of the table-type electronic percussion instrument 1 can be changed over by use of the tablecloth. A sensor 14 such as a piezoelectric sensor is provided to detect an intensity of striking the pad and to convert it to an electric signal. The sensor 14 is securely fixed to an interior face of the hole 13 which corresponds to a selected area of the backside of the dressing board 2, wherein the hole 13 is located to match with the pad. So, the sensor are respectively provided for the pads P1 to P12.

Among the five legs 3, there is provided a hollow leg '3A' (see FIG. 2). The hollow leg 3A whose inside is hollow is the largest in size as compared with the other legs. A musical tone generation circuit 15 is built in the hollow leg 3A to generate musical tone signals based on electric signals given from the aforementioned sensors 14. So, electronic sounds are produced from the speakers 11 on the basis of the musical tone signals. A manipulation panel is attached to a selected area of a surface of the hollow leg 3A. Herein, a power switch and other switches 'S' are arranged on the manipulation panel.

Figure 4:
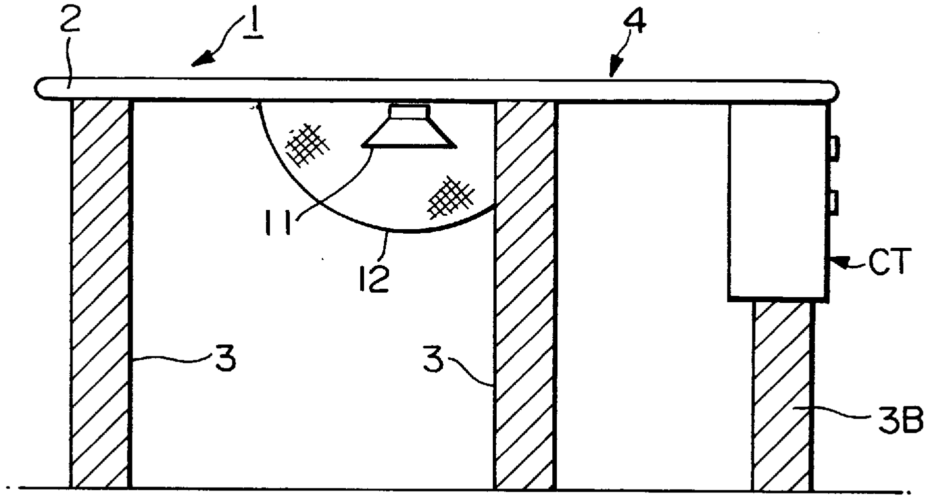
FIG. 4 is a side view showing a modified example of the table-type percussion instrument.

The table-type electronic percussion instrument 1 of FIG. 2 can be modified as shown in FIG. 4. Herein, a control unit CT equipped with a power switch and other switches is located beneath the table board 2 and is supported by a leg 3B which is shorter than the other legs 3. In this modification, it is possible to change a height of the table board 2 by changing lengths of the legs 3 and 3B.

Figure 5:
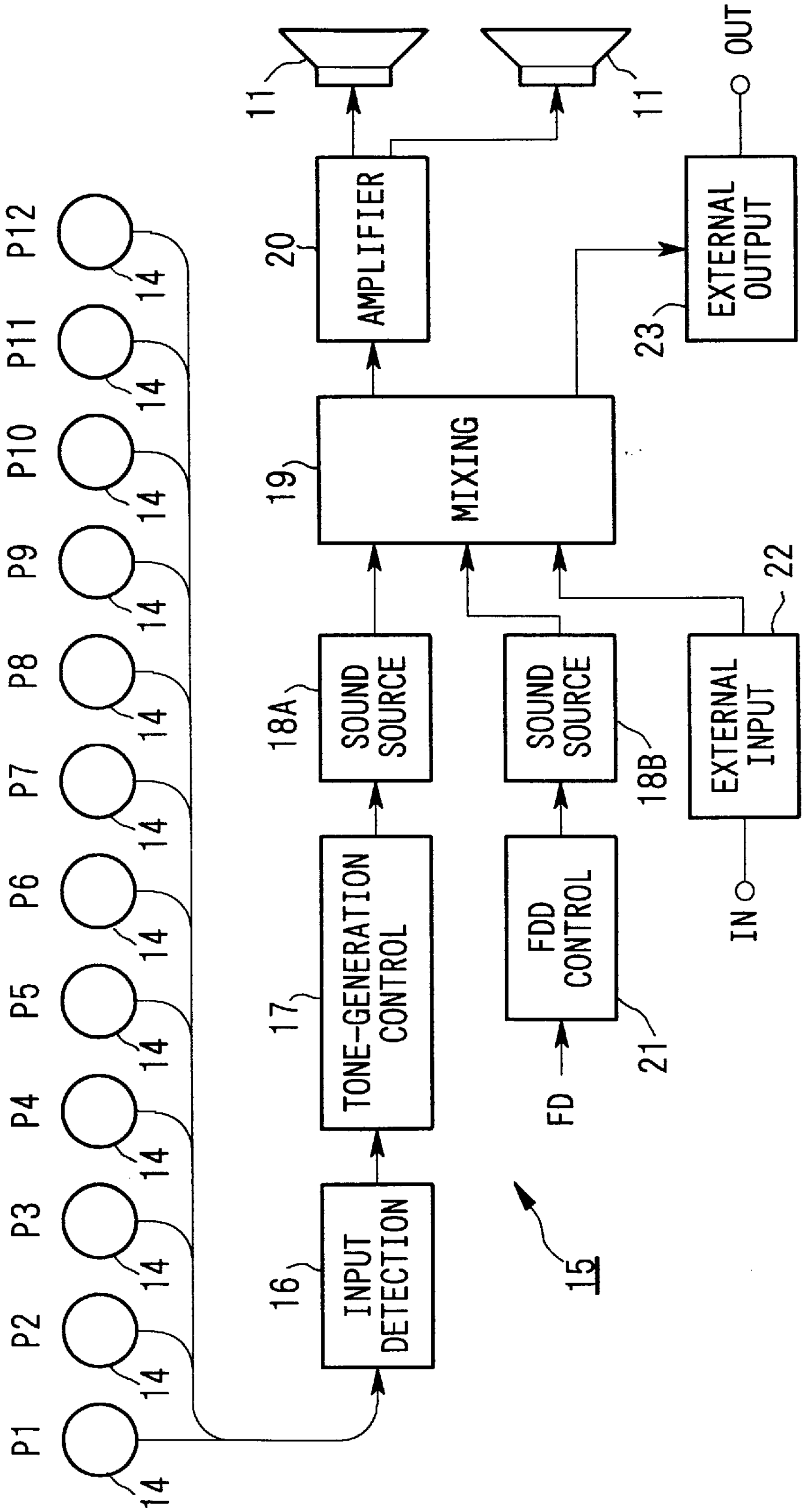
FIG. 5 is a block diagram showing an internal configuration of a musical tone generation circuit.

FIG. 5 is a block diagram showing an internal configuration of the musical tone generation circuit 15 which is connected to the sensors 14. The musical tone generation circuit 15 contains an input detection circuit 16, a musical tone control circuit 17, sound source circuits 18A and 18B, a mixing circuit 19 and an amplifier circuit 20. The input detection circuit 16 performs wave detection and shaping operations on the electric signals given from the sensors 14 which are located in connection with the pads P1 to P12 respectively. A detection signal outputted from the input detection circuit 16 is forwarded to the musical tone control circuit 17. The musical tone control circuit 17 generates a tone-generation control signal based on the detection signal. Herein, the tone-generation control signal controls a tone color, an interval, a sounding duration, etc. The tone-generation control signal is forwarded to the sound source circuit 18A. The sound source circuit 18A generates a musical-tone-waveform signal representing a musical tone waveform based on the tone-generation control signal. The mixing circuit 19 receives the musical-tone-waveform signal (e.g., percussion sound signal) to generate an audio signal. The audio signal is amplified by the amplifier circuit 20 and is then supplied to the speakers 11. Thus, the speakers 11 produce musical tones (e.g., percussion sounds). By the way, a FDD control circuit 21 controls a floppy-disk drive storing a floppy disk which records musical tone signals. So, the FDD control circuit 21 supplies the musical tone signals reproduced from the floppy disk to a sound source circuit 18B which is provided independently of the sound source circuit 18A. Further, external musical tone signals reproduced from a compact disk or a cassette tape are input to an external input terminal 'IN'. The external musical tone signals are supplied to an external input circuit 22. The mixing circuit 19 is connected to the sound source circuits 18A, 18B as well as the external input circuit 22. Thus, the mixing circuit 19 performs mixing operations on musical tone waveforms which are represented by the percussion sound signals, musical tone signals reproduced from the floppy disk and external musical tone signals respectively. As a result of the mixing, the mixing circuit 19 generates mixed audio signals, based on which the speakers 11 produce mixed musical tones. Furthermore, an external output circuit 23 is connected to the mixing circuit 19 to provide the mixed musical tone signals via an external output terminal 'OUT'. So, the musical tone signals can be supplied to other electronic devices.

The table-type electronic percussion instrument 1 is used by multiple persons who sit on chairs to surround the main body 4. The persons strike the pads P1 to P12 by hands or by sticks to play the electronic percussion instrument 1. So, the single instrument can be shared by multiple persons to enjoy playing a music. The present embodiment can be modified in such a way that the sound source circuit 18A is provided for each of the pads P1 to P12. In such a modification, the pads can be related to generation of drum sounds and cymbal sounds individually. So, by playing the single instrument with the multiple persons, it is possible to play an ensemble which simulates an actual ensemble played with multiple instruments such as drums and cymbals. Thus, this invention can provide a brand-new type of the instrument which cannot be actualized by the conventional instrument. Because the speakers 11 are located beneath the main body 4, it is possible to generate each performance sound substantially at a location at which a person strikes a pad. In addition, vibrations of performance sounds transmit to the main body 4 as well as the table board 2. So, the persons can feel the vibrations.

As described before, the table board 2 is constructed by the base material 5 and the dressing board 6 which covers the surface of the base material 5, wherein the multiple holes 13 are formed through the base material 5, whilst the pads P1 to P12 are located on the surface of the dressing board 6 to match with the holes 13 respectively. Herein, sensors 14 are securely attached to the interior walls of the holes 13 to match with backsides of the pads. So, the pads can be partitioned by the base material 5. In other words, there is less possibility that fatigue errors occur due to striking force imparted to some parts of the table board 2 other than the pads. Thus, it is possible to minimize crosstalk between the sensors 14.

Figure 6:
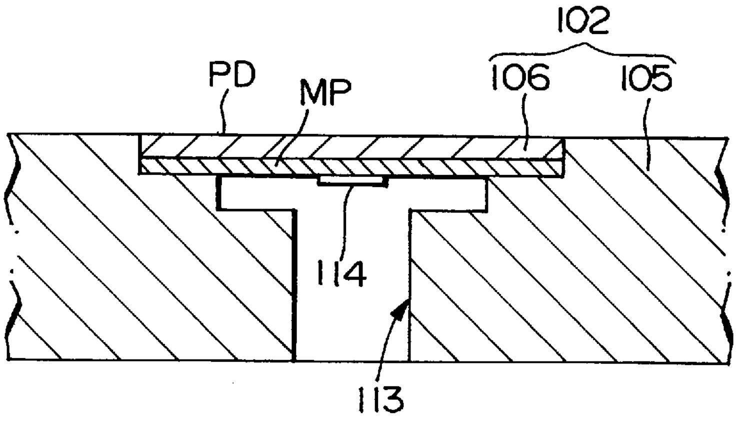
FIG. 6 is a cross-sectional view showing a modified example of the construction of the table board.

FIG. 6 is a cross-sectional view showing a partial construction of a table board 102 which is designed by a modification of the aforementioned table board 2 shown in FIG. 3.

In the modification shown in FIG. 6, the table board 102 is basically constructed by a base material 105 and a dressing plate 106. Different from the aforementioned table board 2 of FIG. 3, the table board 102 of FIG. 6 is constructed in such a way that a dressing plate 106 is placed at a location of a pad PD only. The base material 105 is made of solid laminated lumber having a high rigidity. A hole 113 is formed through the base material 105. The hole 113 consists of a lower-side opening and an upper-side opening which have different diameters respectively. The upper-side opening having a larger diameter is formed in proximity to the pad PD. The dressing plate 106 is made of wood whose grain is made different from that of the base material 105. The dressing plate 106 is embedded in the base material 105 by means of a metal plate MP. An iron plate having a thickness of 1 mm or so is employed for the metal plate MP. A sensor 114 is attached to a lower face of the metal plate MP.

Thanks to the construction of the hole 113 which has two openings having different diameters, it is possible to easily produce vibrations of the pad PD without damaging the strength of the base material 105 because the pad PD has a relatively large area which can be easily vibrated. In addition, the grain of the dressing plate 106 is made different from the grain of the base material 105. This offers an easy visual distinction with respect to the location of the pad PD. In other words, it is not necessary to provide the pad PD with the specific visual display such as the character(s), mark(s) and cloth. Further, the modification of FIG. 6 does not require the print technique used for the melanin dressing board because the grain of the dressing plate 106 is made different from the grain of the base material 105. Furthermore, the modification employs the embedding of the dressing plate 106 in the hole 113. Thus, it is possible to design the dressing plate 106 such that people do not make a feeling of wrongness which may be caused due to the difference between the woods of the base material 105 and dressing plate 106.

Lastly, this invention is not limited to the aforementioned embodiment and modification. In the embodiment, the pad P is formed on the surface of the dressing board 6 and is struck by a hand or a stick. Instead of the pad, it is possible to provide a keyboard of an electronic keyboard instrument on the surface of the table board 2. Thus, it is possible to play an ensemble with the electronic percussion instrument and electronic keyboard instrument.

The embodiment shows that the table board 2 is formed in the pentagon-like shape. The shape of the table board is not limited to such a pentagon-like shape. So, it is possible to employ other kinds of shapes such as a round shape, an elliptical shape and a hexagonal shape.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A table-type electronic percussion instrument comprising:

a table-type main body which is constructed by a table board and a plurality of legs, wherein a plurality of pads are formed on a surface of the table board, and the table board is supported by the plurality of legs;

speakers which are located beneath the table board;

a plurality of sensors that are buried in said table board and which are located beneath the plurality of pads respectively, wherein each of the plurality of sensors detects striking force imparted to each of the plurality of pads so as to convert it to an electric signal; and a musical tone generation circuit for generating musical tone signals based on electric signals given from the plurality of sensors, whereby the speakers generate electronic sounds based on the musical tone signals.

2. A table-type electronic percussion instrument according to claim 1 wherein the table board is constructed by a base material and a dressing board, a plurality of holes are formed through the base material to match with locations of the plurality of pads, the dressing board covering a surface of the base material, each of the plurality of sensors being securely fixed to a backside of the dressing board at a location of each of the holes.

3. A table-type electronic percussion instrument according to claim 1 wherein the musical tone generation circuit is built in one of the plurality of legs supporting the table board.

4. A table-type electronic percussion instrument according to claim 1 wherein the musical tone generation circuit provides a sound source with respect to each of the plurality of sensors.

5. A table-type electronic percussion instrument comprising:

a table board whose shape is determined to enable a plurality of persons to sit, the table board being constructed by a base material whose surface is covered by a dressing board, wherein a plurality of holes are formed through the base material;

a plurality of legs for supporting the table board;

a plurality of pads which are formed on a surface of the dressing board in connection with the plurality of holes respectively, wherein the pads are arranged to enable the persons to strike;

a plurality of sensors that are buried in said table board and which are located inside of the plurality of holes respectively at a backside of the dressing board in connection with the plurality of pads respectively, wherein each of the sensors detects striking force imparted to each of the pads to generate an electric signal;

a musical tone generation circuit for generating a musical tone signal based on the electric signal given from each of the sensors, wherein the musical tone generation circuit is placed in connection with a specific leg which is selected from among the plurality of legs; and a speaker system which is located beneath the table board to generate a musical tone based on the musical tone signal.

6. A table-type electronic percussion instrument according to claim 5 wherein the musical tone corresponds a percussion sound which is either a drum sound or a cymbal sound.

7. A table-type electronic percussion instrument according to claim 5 wherein the musical tone generation circuit contains a mixing circuit which is capable of mixing the musical tone signal which is generated in response to striking force imparted to the pad and another musical tone signal supplied thereto, so that the mixing circuit generates mixed musical tone signals which enable the speaker system to generate sounds of an ensemble.

8. A table-type electronic percussion instrument according to claim 5 wherein the base material is made of a wood having a high rigidity whilst the dressing board is made of a wood whose rigidity is lower than that of the base material.

9. A table-type electronic percussion instrument according to claim 5 wherein the table board is constructed by a base material having a high rigidity, and a plurality of dressing plates are located on a surface of the base material to match with the locations of the pads, wherein each of the dressing plates is backed by a metal plate to which each of the sensors is securely attached.

10. A table-type electronic percussion instrument according to claim 5 wherein the musical tone generation circuit is located beneath the table board and is supported by the specific leg which is selected from among the plurality of legs.

11. A table-type electronic percussion instrument according to claim 5 wherein said table-type percussion instrument simultaneously accommodates multiple persons so said instrument is shared by those persons.

* * * * *